Aug. 23, 1966 W. W. CEASE 3,268,102
APPARATUS FOR DISPENSING AND INVERTING FOOD PACKAGES
Original Filed Feb. 18, 1963 5 Sheets-Sheet 1
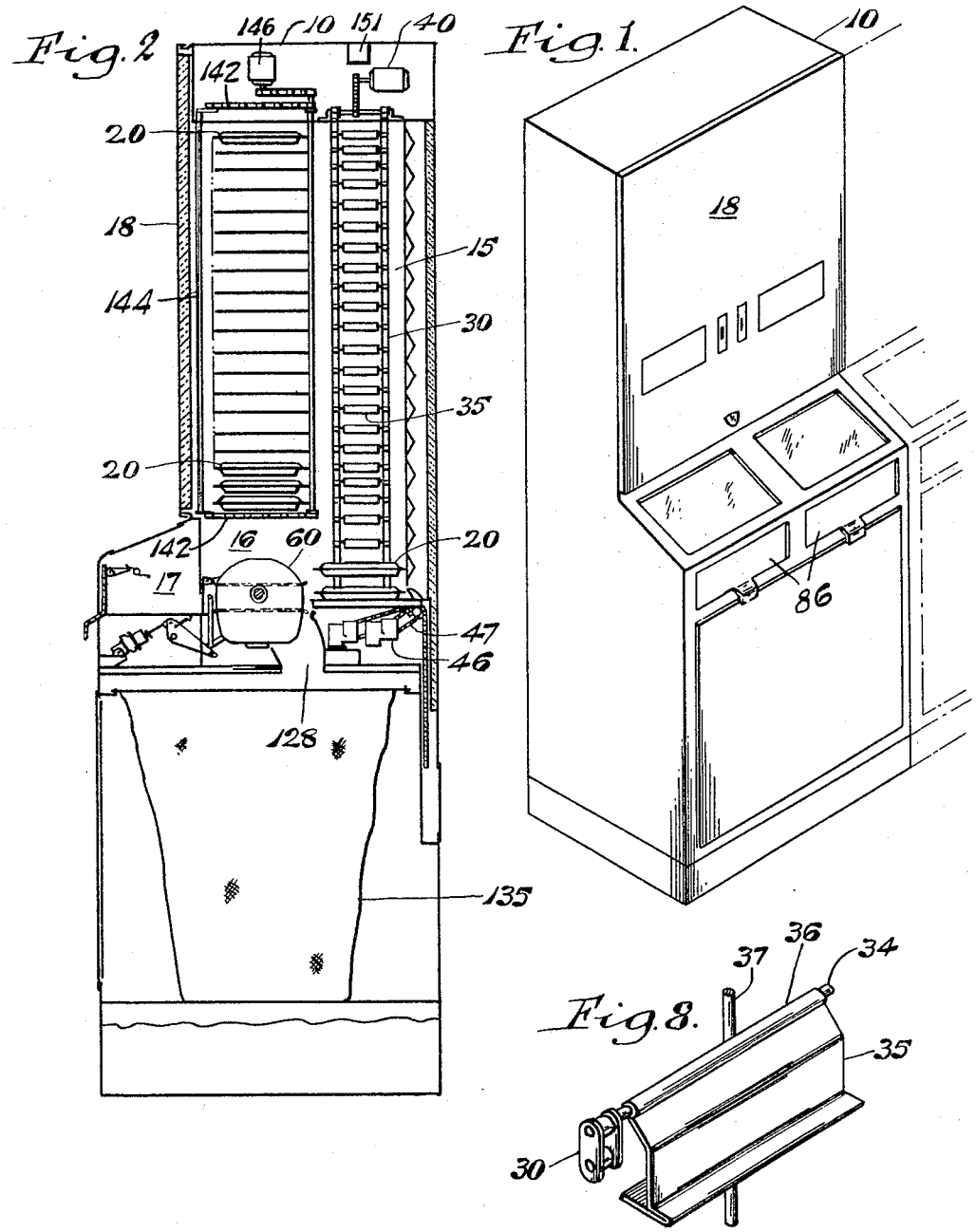
INVENTOR.
William W. Cease
BY
Christel & Bean
ATTORNEYS.

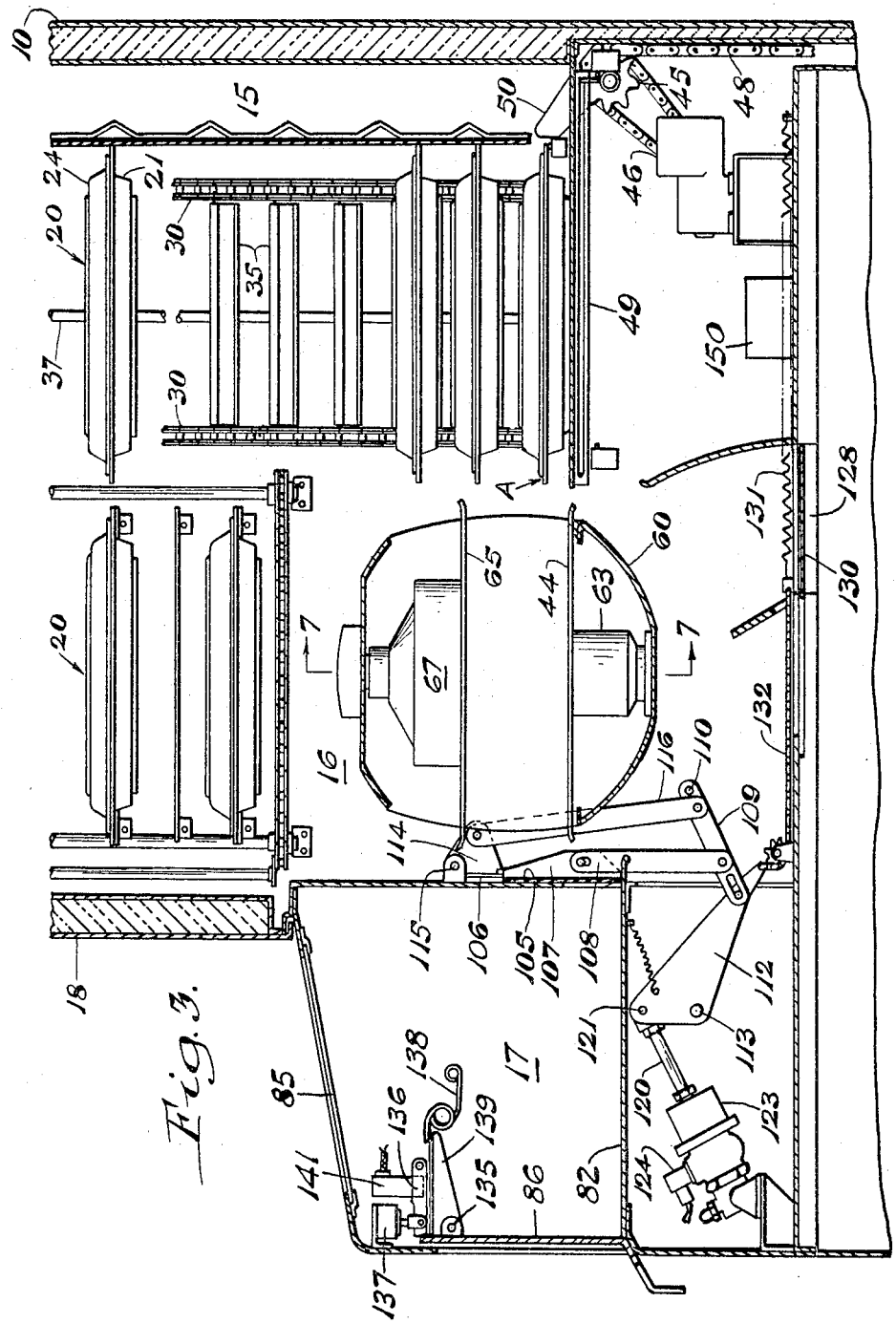

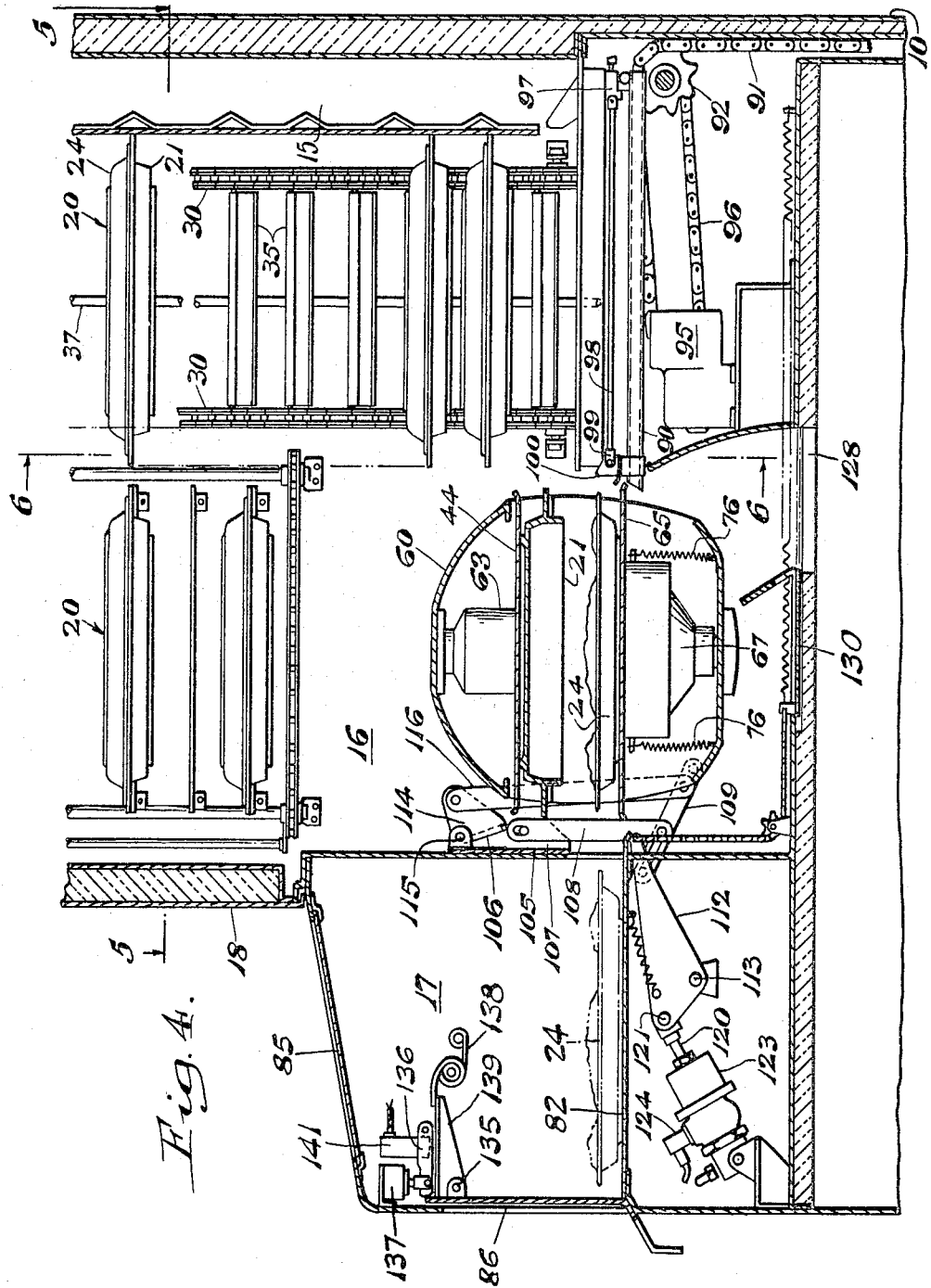

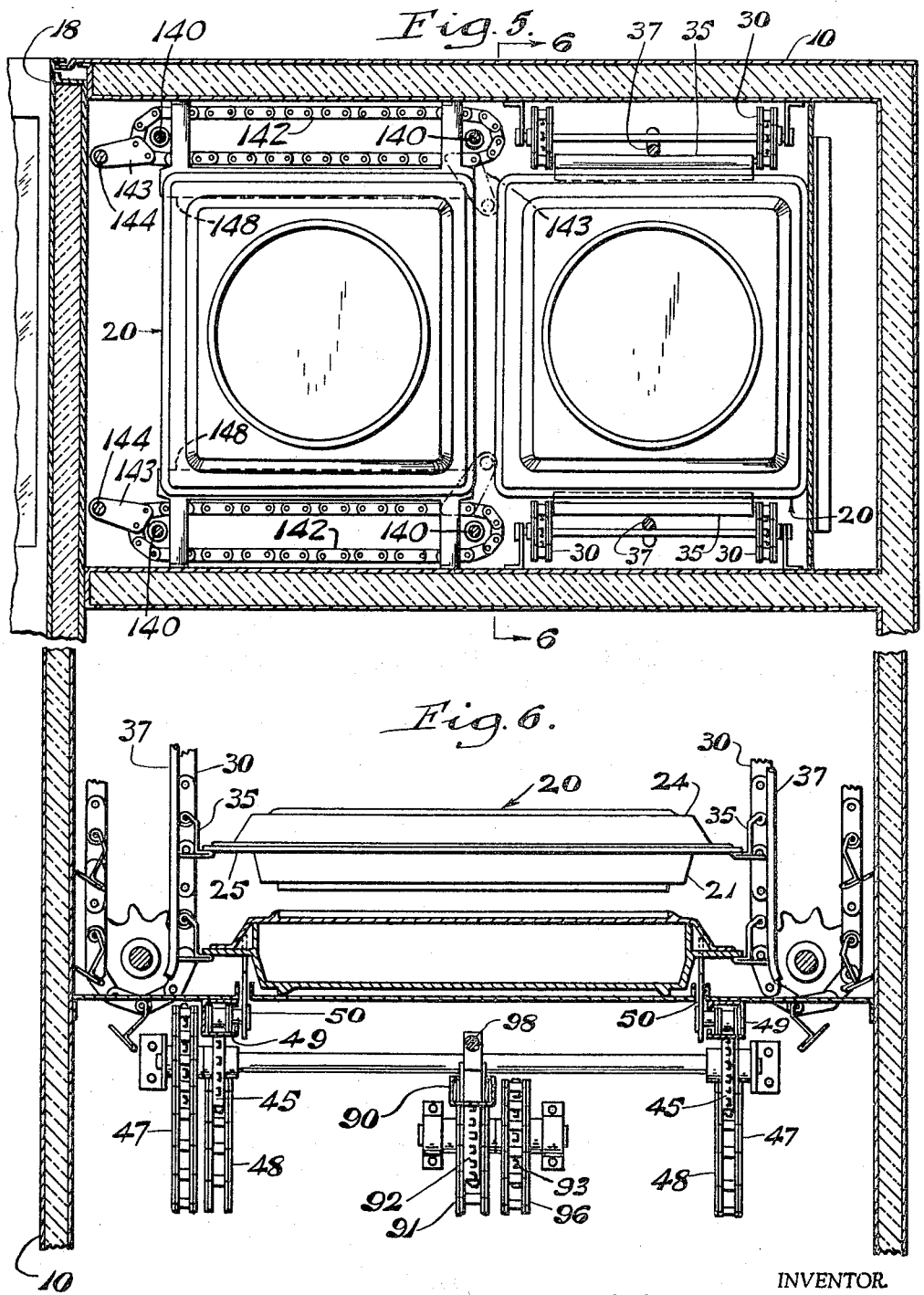

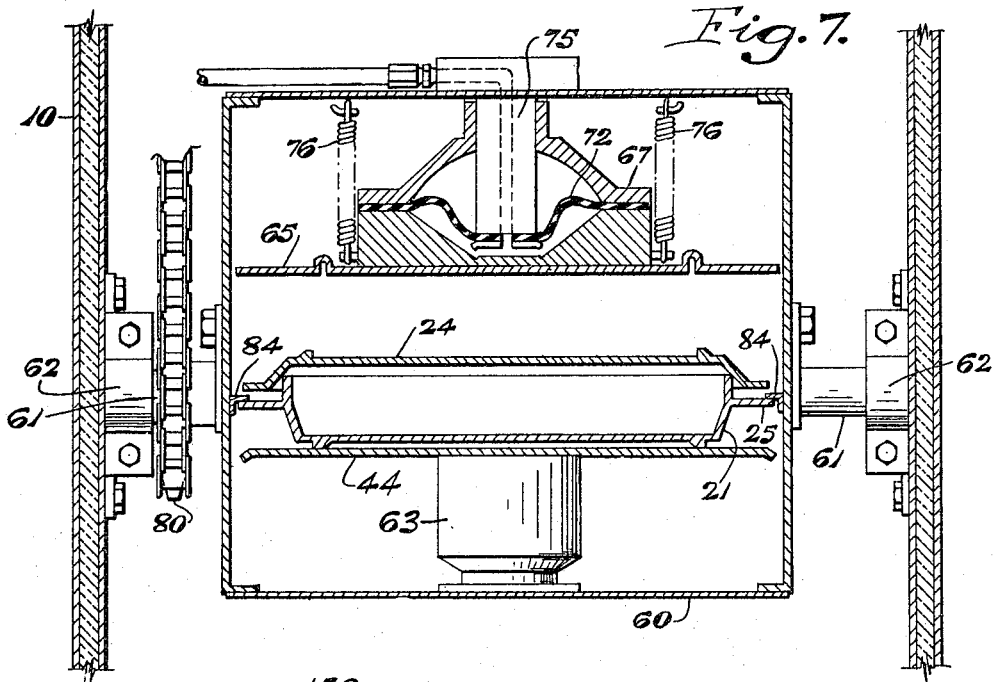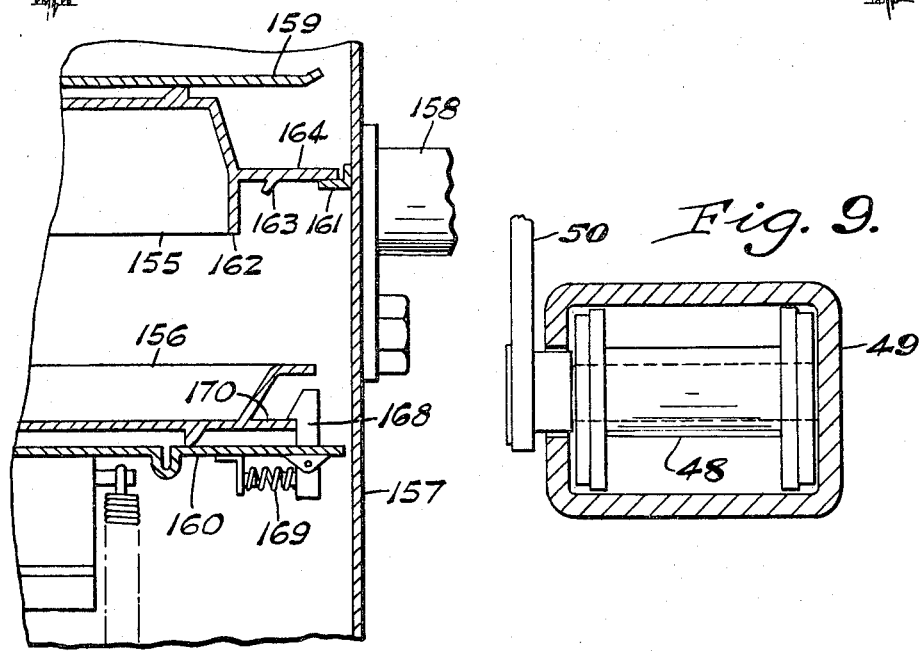

3,268,102
APPARATUS FOR DISPENSING AND INVERTING
FOOD PACKAGES
William W. Cease, Fredonia, N.Y., assignor to
Cease Central, Inc., Dunkirk, N.Y.
Original application Feb. 18, 1963, Ser. No. 259,158.
Divided and this application Apr. 29, 1965, Ser. No.
462,161
2 Claims. (Cl. 214—314)

This application is a division of application Serial No. 259,158, filed February 18, 1963.

This invention relates to the handling and dispensing of food portions or servings as in restaurant operation, catering, commissaries and like enterprises, and in vending machines.

I have found that food servings which are previously prepared and which are to be heated for serving, as in the case of frozen dinners merely by way of example, are advantageously retained in upside down position in a container or receptacle up to the time of serving and then inverted in the operation in which the food is deposited on a serving plate or dish.

By packing or preparing the food portions in inverse order and thus turning the same over during final dispensing, sauces, juices, and similar liquid or semi-liquid components or dressings are deposited on top of the more solid food components just prior to serving, thus delivering the food serving to the consumer in a most attractive and appetizing form and one which has a freshly prepared appearance and delivers the food in the best condition for consumption.

Certain basic principles of this food packaging and dispensing procedure and of the packages themselves are disclosed in my copending patent applications, Serial No. 220,517 and Serial No. 220,518, both filed on August 30, 1962.

In general the above principle of handling and dispensing food embraces food packages which may take various forms but which comprise essentially a food containing element in which the food may be frozen or introduced in frozen condition or may merely be deposited in individual servings prior to the dispensing operation described herein. A second essential element is a serving plate or dish which, in the food package prior to dispensing, is disposed over the container element to serve as a cover and, upon final inversion, receives the food from the container.

The container element may comprise a holder with one or more individual containers supported therein or thereby or may comprise a single unitary device having one or more food receiving compartments or wells. The container and plate elements are preferably provided with interfitting or locating means for retaining the same against axial displacement and such means may be integral with the container and plate elements or may comprise a third intermediate frame or band element.

In addition to the fact that individual container and plate elements are arranged for accurate relative lateral location with respect to each other, means may be provided, in some instances, whereby a vertical series or stack of packages are self-aligning by reason of interfitting formations at the top of one package and the bottom of a package resting thereon.

The present invention provides apparatus for receiving a stack or stacks of food packages, for automatically advancing the same to a dispensing zone, inverting each package when it is to be dispensed to transfer the food from the container element to the serving plate element, moving the plate element to a position for delivery, and disposing of the container element. In addition, means are preferably provided for vibrating the container element to provide an agitating or stirring effect to gravies, sauces and the like as well as to promote transfer of the contents of the container to the plate upon inversion.

Numerous other objects and advantages of the general apparatus of the present invention will appear to those skilled in the art from a consideration of the typical embodiment of the present invention illustrated in the accompanying drawings and described in the ensuing specification.

The apparatus of the present invention may assume various mechanical and physical forms and may be adapted to various manual, automatic, semi-automatic and coin-operated uses. A complete embodiment of one mechanical form of the apparatus of the present invention is set forth herein to exemplify the principles of the invention but it is to be understood that the scope of the invention is not limited thereto nor otherwise than as defined in the appended claims.

In the drawings:

FIG. 1 is a general perspective view of one form of the food handling apparatus of the present invention;

FIG. 2 is a general cross-sectional view taken on a plane through the apparatus of FIG. 1 from front to back thereof;

FIG. 3 is a fragmentary cross-sectional view taken similarly to FIG. 2 but on an enlarged scale and showing the lower ends of the stack arrangements and the inverting and delivery mechanism;

FIG. 4 is a fragmentary cross-sectional view similar to FIG. 3 shown after inversion and illustrating the means for moving service plates from the inverter;

FIG. 5 is a cross-sectional view on a horizontal plane through one of the two units comprising the apparatus of FIG. 1;

FIG. 6 is a fragmentary cross-sectional view taken approximately on the line VI–VI of FIG. 5;

FIG. 7 is a cross-sectional view taken approximately on the line VII–VII of FIG. 3;

FIG. 8 is a fragmentary perspective view of one of the package supporting devices of FIG. 6;

FIG. 9 is an enlarged fragmentary cross-sectional view through one of the package transfer devices of FIG. 3; and FIG. 10 is a cross-sectional view similar to FIG. 7 but showing a modified form of package retaining means for separating service plates and containers.

Like characters of reference denote like parts throughout the several figures of the drawing and referring particularly to FIG. 1, the numeral 10 designates a cabinet which houses two side-by-side dispensing units whereby two separate food servings or food serving combinations may be selectively dispensed or, if desired, the two units may contain the same food servings or combinations. As many of these dual units as desired may be aligned as indicated by the dot and dash lines in FIG. 1.

Each of these units comprises a storage portion for a substantial number of like food serving packages or food serving combination packages, means for successively feeding or advancing such packages, an inverting zone to which individual meals or servings are delivered one by one from the storage portion where the package is inverted and preferably vibrated, and a final delivery space which is accessible to a patron or other person for removing the food serving or the like from the apparatus.

In FIG. 2 one of the four units is shown in longitudinal cross-sectional elevation and the storage portion is designated 15, the inversion space 16 and a delivery space 17. As shown in FIG. 1, the cabinet 10 is provided with a front door 18 for access to the two storage portion units for loading the same with food packages or servings.

Reference will first be had to the means for storing a plurality of food packages or servings and for delivering them one by one to the inverting space, with reference particularly to FIGS. 3, 5 and 6, the latter being a lateral cross-sectional view through the storage portion.

An individual food package is shown generally at 20 in the drawings and it is to be understood that various forms of food packages may be employed in the present apparatus as generally outlined in the preamble hereto.

In the form shown herein merely by way of example, each package 20 comprises a container 21 and an overlying inverted food serving plate 24, the upper edges of the container 21 being adapted to locate the plate 24 laterally thereon. In variant forms the container 21 may have several food containing wells therein, instead of only one, and the wells may be insertable in the container and removable therefrom. This representative form of food package is shown and described in greater detail in my above-mentioned copending patent application, Serial No. 220,517, filed August 30, 1962, and particularly in FIGS. 1 through 9 thereof. In the present instance the containers 21 have marginal flanges 25 by means of which the packages are engaged and supported in the present apparatus.

Referring particularly to FIGS. 2 and 3, each of the two units of the storage portion 15 contains means for supporting individual packages 20 in two vertical tiers or stacks in such manner that the packages of the rear tier are successively lowered to a point where they may be moved horizontally forwardly from the storage portion to the inversion space 16. In the present instance the forward tier of packages comprises a reserve tier which is moved into the rear tier position when all of the packages have been dispensed from the latter.

As shown in FIGS. 3 and 4, vertically extending chain and sprocket devices 30 are disposed at opposite sides of the rear tier portion of each of the two units of the storage space, there being a pair of such chain and sprocket devices at each side, one at the front of the rear tier portion and one at the rear. Certain of the links of front and rear chains at each side of the unit are connected by a series of rods 34 and support members 35 of angular cross-section are pivotally suspended from the rods 34 as at 36. Thus an aligned pair of angle members 35 at opposite sides of the unit provide support for the flanges 25 of a food package 20.

It is to be understood that the inner or facing portions of the chains 30 at opposite sides of a unit move downwardly to lower food packages and the outer or remote sides of the chains move upwardly. Vertical rods 37 are fixedly supported in cabinet 10 so that they lie along the outsides of the supports 35 on the downward travel sides thereof to hold the same in the supporting position illustrated in the fragmentary perspective view, FIG. 8. On the return upward travel the supports are held inwardly by the walls of the cabinet as shown in FIG. 6 whereby the chain and support structure occupies a minimum of lateral space at each side of the tier of packages.

An electric operating motor 40 is provided for the set of chain and sprocket mechanisms 30 of each storage unit, the sprocket mechanisms 30 at each side of the unit being connected for synchronous movement as by means of a cross shaft and miter gears (not shown). The several operating motors for the inverter, the mechanism for moving packages to and from the inverter, the motor 40, and others may all be under the common control of a conventional rotary limit switch having cams set to start and stop the various motors at proper points in the operating cycle of the apparatus.

Each operating period of motor 40 operates the chain and sprocket mechanisms of a unit through a sufficient distance to lower all of the packages supported thereby a distance equal to the vertical pitch of the supports 35 whereby each pair of supports 35 is successively lowered to a position wherein the packages 20 carried thereby reach the level indicated at A in FIG. 3.

At this point or whenever thereafter a food package is to be dispensed, means become operative for shifting the packages at the level indicated at A in FIG. 3 to the left, as there shown, to move one of the packages 20 on to a support plate 44 of the inverting mechanism which will presently be described. Referring to FIG. 3, a pair of laterally spaced sprockets 45 are disposed beneath the packages at the level A and are operated by means of a drive motor 46 which is connected to sprockets 45 by a chain and sprocket drive 47 shown in FIG. 2.

Lengths of chain 48 pass over sprockets 45 and extend into rectangular tubes 49, one of which is shown enlarged in FIG. 9. Tubes 49 guide chains 48 horizontally and are longitudinally slotted so that one of the pins of each chain may extend laterally therethrough to receive a feed dog or pusher member 50. Motor 46 operates a predetermined period in one direction to move the pushers 50 to the left from the position shown in FIG. 3 onto support plate 44 and then reverses to retract pushers 50 to the position shown in FIG. 3.

Reference will now be had to the mechanism and means for handling packages 20 after they pass on to the support plates 44 in the inverting zones 16. The general support for the inverting device comprises a hollow beam member 60 which is best shown in FIGS. 3, 4 and 7, which has a pair of trunnions 61 at its opposite ends which are journaled in bearings 62 which are fixed to opposite side walls of each inversion zone 16. Support plate 44 is fixed to beam member 60 by a connection 63 which includes an electric vibrator acting between beam member 60 and support plate 44 and spaced substantially thereabove is a platen member 65 which overlies packages 20 which have moved onto supports 44.

Each platen 65 is provided with fluid pressure motor means for moving the same selectively toward and away from support plate 44. As shown in FIG. 7, a diaphragm type fluid pressure motor casing 67 is fixed to platen 65 and has a diaphragm 72, the central portion of which is fixed to the end of a post 75 secured to beam member 60. In FIG. 7 platen 65 is shown in raised position wherein extension springs 76 acting between platen 65 and beam 60 urge the platen upwardly.

Applying air pressure to motor casing 67 at the lower side of diaphragm 72, as viewed in FIG. 7, expands the space beneath the diaphragm and forces platen 65 downwardly, the motor casing being slidable on post 75, and a package 20 is thus clamped between support plate 44 and platen 65.

At this point a motor (not shown) located in the upper end of the cabinet and operating through a sprocket 80 fixed to one of the trunnions 61 rotates the beam member 60 through 180° to invert package 20 so that the serving plate member 24 thereof is then in its normal position of use and the contents of the containers 22 and 23 are automatically deposited upon plate 24.

During and immediately following this inversion a vigorous vibration action is imparted to the package by the vibrator-connection 63 and particularly to the container 21 to vibrate the latter and thus more completely empty the same on to plate 24 and also agitate the liquid or semi-liquid components to mix the same.

Following this 180° inversion movement, the air pressure is released whereby, as shown particularly in FIG. 4, the platen 65 moves downwardly under the action of spring 76 and the plate 24 is lowered until platen 65 is substantially in alignment with a receiving surface 82 in the delivery space 17. During this movement the inverted container 21 is held in raised position by reason of the engagement of the flanges 25 thereof with ledges 84 at the interior end walls of beam 60, such ledges being shown in FIG. 7. It is to be understood that at this phase of the operation the beam 60 is inverted from the position shown in FIG. 7. The plate 24 is now fully ready for dispensing and serving and means are provided for moving the same onto the receiving surface 82 of the delivery space 17.

FIG. 4 illustrates the mechanism which is operative to push a plate 24 from the full line position on platen 65, upon which it rests after inversion of a package 20, outwardly into the delivery space 17. As shown in FIG. 4, the delivery space 17 is preferably provided with a glass cover portion 85 so that the presence of a serving plate therein may be readily observed and a door member 86 may be raised to remove the plate 24 containing food servings.

In FIGS. 4 and 6 the numeral 90 designates a rectangular tube which is disposed centrally of the unit as viewed in FIG. 6 and a chain 91 is guided therein. Chain 91 passes over a sprocket 92 which is driven from an adjacent sprocket 93 (see FIG. 6) which has chain drive connection with a drive motor 95 as at 96 in FIG. 4. A bracket 97 extending upwardly from chain 91 through a slot in tube 90 operates a pushrod 98 the other end of which has a cross-shaft yoke 99 for attachment to a pair of laterally spaced pushers 100.

Since the interior of the cabinet generally may be at a temperature substantially higher or lower than room temperature for maintaining foods in heated or cooled condition, and also to prevent tampering and pilfering, a closure is provided between the dispensing zone 16 of each unit and the delivery space 17 thereof, such closure being automatically opened only during the period when a serving plate 24 is being pushed from a platen 65 in the inversion zone to the delivery space 17. The means for controlling door movements is illustrated in FIGS. 3 and 4 to which reference will now be had.

The portion of the cabinet front wall structure between the inversion zone 16 and the delivery space 17 of each unit is provided with a vertical slidable door 105. A plate member 106 normally lies directly above door 105 to prevent raising movement thereof. Door 105 is provided with a flange 107 and a link 108 is pivoted at its opposite ends to flange 107 and to an arm 109. Arm 109 is pivoted to the cabinet as at 110 and at its outer end has pivoted play connection with a bell crank 112 which is pivoted to the cabinet as at 113.

Door lock plate 106 includes a flange 114 pivoted to the front wall of the apparatus as at 115. A link 116 is pivotally connected at its opposite ends to flange 114 and to arm 109 as shown in FIGS. 3 and 4. An operating rod 120 is pivoted as at 121 to bell crank 112 and comprises the piston rod of an air pressure operating cylinder 123. A solenoid valve 124 which controls cylinder 123 is connected with the rotary limit switch unit described previously herein.

From the beginning position shown in FIG. 3 counterclockwise rotation of bell crank 112 raises the links 108 and 116. This swings lock plate 106 rearwardly from its locking position and raises door 105.

After the plate on platen 65 has been transferred to the delivery space 17 by pushers 100 and with the platen 65 and support 44 still in the vertically separated condition illustrated in FIG. 4, the beam member 60 and platen 65 and support 44 are rotated through another one-half revolution to restore the inverting mechanism to the initial position illustrated in FIG. 3.

During this half revolution and when the support 44 has moved approximately 45° or slightly more, the container 21 which has thus far been retained by ledges 84, falls through a receiving opening 128. The flanges 25 of the container 21 slide downwardly off of the ledges 84 enabling the container 21 to fall clear.

A sliding door 130 normally closes opening 128, as shown in FIG. 3, and is yieldably held in closed position by an extension coil spring 131. A chain element 132 connects between the left hand of door 130, as viewed in FIG. 3, and the extreme right-hand portion of bell crank 112. Accordingly, counterclockwise movement of bell crank 112 to open door 105 likewise moves door 130 to the open position illustrated in FIG. 4. Door 130 again closes after a plate 24 has been pushed into the delivery zone and the container 21 associated therewith has fallen through opening 128 to the receiving bag shown at 135 in FIG. 1.

Referring to FIG. 4, when a plate 24 ready to serve is in the delivery compartment 17, door 86 is swung outwardly by a patron or server by pivotal movement on pivots 135. A latch 136 normally prevents opening pivotal movement of door 86 and is adapted to be raised by an electromagnet 137 upon closure of door 105 after delivery of a plate to compartment 17. A torsion spring 138 which is engaged by an arm 139 fixed to door 86 cushions the closing movement of door 86. When door 86 is opened to remove a plate another dispensing, inverting and delivery cycle cannot be started until a microswitch 141 is closed by arm 139 upon re-closing of door 86.

Referring now to FIGS. 2 and 5, the means for replenishing the rear tier of packages 20 when the same is depleted will now be described. As shown in FIG. 5, four vertical shafts 140 are provided with sprockets at their upper and lower ends which engage chains 142. Arms 143 are fixed to the upper and lower chains and vertical rods 144 extend between the outer ends of the upper and lower arms 143.

A reversible electric motor 146 (FIG. 2) operates to rotate the shafts 140 and move the arms 143 from the full line position of FIG. 5 to the dot and dash line position to move a stack of packages from the ledges 148 of the front tier to the supporting angles 35 of the rear tier. A photoelectric relay 150 (FIG. 3) is disposed centrally beneath the rear stack and an illuminating device 151 (FIG. 2) actuates the relay when the last package 20 is moved to the inverting mechanism. This energizes motor 146 to effect transfer of the front stack to the rear. A manual pushbutton switch may be provided whereby an operator, just prior to replenishing the front stack through door 18, may reverse the chains 142 to restore the arms 143 and rods 144 to their initial position.

In certain adaptations the service plate-cover may be sealed to the container in a manner which requires a more positive separation after inversion. FIG. 10 illustrates a modified inverter and package construction for this purpose. FIG. 10 is a fragmentary elevational view taken similarly to FIG. 7 but in an inverted position. In FIG. 10 the container is designated 155, the service plate 156, the rotating beam 157, a trunnion 158, support plate 159 and platen member 160. All of these elements are the same as the corresponding members of the principal embodiment with the following modifications. Also, ledges 161 at opposite ends of beam 157 correspond to the ledges 84 of the previous embodiment.

Various means may be employed for sealing the container and service plate. For instance, the rim portion 162 of container 155 may have a press fit in service plate 156 or a projection as at 163 on the flange 164 of container 155 may fit into the upper end of service plate 156. Many other sealing provisions may be employed.

In the embodiment of FIG. 10 platen member 160 has pivoted latch members 168 at opposite sides thereof which are urged to the position shown in FIG. 10 by springs 169 and service plate 156 has projections 170 at opposite sides thereof. Accordingly, during the clamping operation, before the beam 157 has been rotated to the position shown in FIG. 10 and with the sealed package resting on support plate 159, the downward clamping movement of platen member 160 engages latch member 168 with projections 170 as shown in FIG. 10.

Thus, when the beam 157 is inverted and platen member 160 is lowered the container 155 is held in raised position by flanges 161 and the service plate 156 is pulled forcibly downwardly from the container by reason of the latch engagement, releasing whatever sealing device or arrangement may be employed between the container and service plate.

I claim:

1. Apparatus for handling food packages each comprising a food container and an overlying inverted service dish acting as a cover for the container, said apparatus comprising a support surface adapted to receive a food package thereon and a generally horizontal platen member overlying the same, means for moving said support surface and said platen member toward each other to clamp a package therebetween, means for rotating said support surface and platen member jointly approximately 180° about a horizontal axis to invert said package and transfer the contents of said container to said service dish, means for moving said support surface and platen member apart, means for retaining said container in raised position adjacent to said support surface whereby said container and service dish are separated and said service plate remains on said platen member ready for delivery, and rotating means being operative upon delivery of said service plate from said platen member to rotate said support surface and platen member to initial position, said container being adapted to slide downwardly on said retaining means from between said support surface and platen member during such return rotation to thereby discharge the container.

2. Apparatus for handling food packages each comprising a food container and an overlying inverted service dish acting as a cover for the container, said apparatus comprising a support surface adapted to receive a food package thereon and a generally horizontal platen member overlying the same, means for moving said support surface and said platen member toward each other to clamp a package therebetween, means for rotating said support surface and platen member jointly approximately 180° about a horizontal axis to invert said package and transfer the contents of said container to said service dish, means for vibrating said platen member to facilitate such transfer, means for moving said support surface and platen member apart, means for retaining said container in raised position adjacent to said support surface whereby said container and service dish are separated and said service plate remains on said platen member ready for delivery, and rotating means being operative upon delivery of said service plate from said platen member to rotate said support surface and platen member to initial position, said container being adapted to slide downwardly on said retaining means from between said support surface and platen member during such return rotation to thereby discharge the container.

References Cited by the Examiner

UNITED STATES PATENTS

| | | | |
|---|---|---|---|
| 1,973,163 | 9/1934 | Davis | 214—53 |
| 2,570,717 | 10/1951 | Ronceray | 214—312 X |
| 2,838,184 | 6/1958 | MacCuroy. | |
| 3,071,258 | 1/1963 | Seigh et al. | |
| 3,089,598 | 5/1963 | Temple. | |

FOREIGN PATENTS

| | | |
|---|---|---|
| 1,189,005 | 9/1959 | France. |

HUGO O. SCHULZ, *Primary Examiner.*

GERALD M. FORLENZA, *Examiner.*

A. GRANT, *Assistant Examiner.*